April 12, 1938.   N. P. PRATT   2,113,601
METHOD OF UTILIZING THE ENERGY OF FUEL CHARGES
IN INTERNAL COMBUSTION ENGINES
Filed Feb. 28, 1933   3 Sheets-Sheet 1

Inventor
Nathaniel P. Pratt,
By
Edmund H. Perry Jr.
Attorney

April 12, 1938. N. P. PRATT 2,113,601
METHOD OF UTILIZING THE ENERGY OF FUEL CHARGES
IN INTERNAL COMBUSTION ENGINES
Filed Feb. 28, 1933 3 Sheets-Sheet 2

Inventor
Nathaniel P. Pratt,
By
Edmund N. Perry Jr.
Attorney

Patented Apr. 12, 1938

2,113,601

UNITED STATES PATENT OFFICE 2,113,601

METHOD OF UTILIZING THE ENERGY OF FUEL CHARGES IN INTERNAL COMBUSTION ENGINES

Nathaniel P. Pratt, Atlanta, Ga.

Application February 28, 1933, Serial No. 658,986

27 Claims. (Cl. 123—1)

This invention relates to method of utilizing fuel in internal combustion engines, and has as its particular object the development of greater power in such engines, and the more efficient and economical use of the fuel whereby all of the combustible values in the fuel are completely consumed in the engine and enter into the production of power. To these ends the invention contemplates the utilization of each quantity of fuel to produce a series of successive explosions in internal combustion engines with accompanying power impulses, the fuel in the form of a charge first being subjected to a primary explosion in one or more engine cylinders and the products of combustion thereafter treated to form a new explosive fuel charge which in turn develops additional engine power. As is known, the gaseous products of combustion contain quantities of unconsumed fuel values and these I have found can be employed to form a new explosive mixture with properly proportioned quantities of air, which can be used in engine cylinders by explosion substantially in the same manner as the original fuel charges.

Whereas conventionally fresh fuel is used to produce each explosive power impulse in all internal combustion engine cylinders, the present method makes it possible to get half the explosions from hitherto waste gases which were exhausted to the atmosphere. Thus, tremendous fuel economy is effected in that from each quantity, or charge, of fuel supplied, two instead of one explosive power impulses are obtained.

A very important feature of my invention from a practical standpoint is that, so far as I have been able to ascertain, it may be carried out in the various types of internal combustion engines and this without any fundamental changes in the engine construction proper. The special parts necessary to the practice of my method may be produced at nominal cost, and engines designed to operate conventionally may readily be converted to obtain the benefits of the invention.

It being apparent that the general concept of exploding fuel charges and exploding mixtures formed from the resulting products of combustion, each producing a power impulse, may be carried out in various ways, I do not intend to restrict the invention to any particular specific application or structure. It now appears to me, however, that the preferable manner of application from the standpoint of simplicity in engine structure and operation comprises the explosion of fuel charges in some engine cylinders; the withdrawal of the residual gases following explosion and the power impulses of the pistons incident thereto; the production of a new explosive mixture from the gases; and, the introduction and explosion of the new mixture, or secondary fuel charge, in other engine cylinders. It is to be understood that in any case the two explosions are discontinuous and independent, in the sense that the combustion incident to the primary explosion of the fuel is brought to apparent completion and the residual gases subjected to admixture with air while in non-flaming condition to form a new independent explosive mixture comparable to the fuel charge which will be ignited only under proper operating conditions in the cylinders wherein the mixture is used.

The efficiency of internal combustion engines, such, for example, as the gasoline engine used in motor cars, is extremely low, only about 13.5% of the heat units present in the fuel actually going into the development of engine power. There is a loss of heat units going into the exhaust amounting to about 30% of the whole, and additionally about 21.5% of the heat units pass out into the exhaust as gases containing substantial portions of combustible ingredients including hydrogen, methane and carbon monoxide. The presence of such constituents in those gases definitely indicates that the explosion of a fuel charge in an engine is far from complete. When fuel is formed into a charge with air and ignited in the cylinder of an engine, the combustible ingredients present are only partly consumed with the result that a substantial portion of the potential energy of the fuel is not converted into power upon explosion of the fuel charge but is wasted, passing out through the engine exhaust. The combustible ingredients forming a part of the exhaust are not in any sense mere unburned portions of the original fuel. Under the combustion the fuel undergoes a complete change and breakdown in its chemical composition and the combustibles in the exhaust are of entirely different chemical constitution. The normal motor fuel is usually a mixture of complicated hydrocarbon ingredients while, as shown in the table hereafter set forth, both the combustible and non-combustible ingredients resulting from the fuel explosion are relatively simple chemical compounds. These points are mentioned because it is necessary to consider the chemical aspects of the invention for a full understanding of the process and the results obtained therefrom.

According to my invention this waste in power, which is available in the fuel, is overcome to such an extent that the exhaust from an engine will contain only fully expended gases and vapors containing practically no combustible ingredients. This result is of great importance not only with reference to power development and fuel efficiency, but also from the point of health. The normal automobile exhaust contains combustible constituents which are extremely poisonous and which, according to the present invention, are entirely eliminated.

With the view of making the application of my method entirely clear I have in the accompanying drawings illustrated several types of internal combustion engines arranged to operate according thereto, such parts as are novel in design or arrangement being shown in detail. Detailed consideration will hereafter be given to the drawings, wherein.

In order to understand how, according to my invention, a fuel charge may be exploded and the products of explosion utilized to form a new combustible mixture which can be in turn exploded with the results indicated, it is advisable first to allude to certain facts regarding fuel with reference to its use in internal combustion engines.

Fuel is rendered explosive only under certain conditions, it being a primary requisite that a certain proportion of air be present with the fuel in order to support explosion. If too little air is present very incomplete combustion occurs with resulting small power output, and if too much air is present there is likely to be no explosion but only a partial burning of the fuel without detonation and violent combustion such as necessary to develop substantial power in an internal combustion engine. Accordingly, the carburetor or other charge forming device for an engine must be set within certain limits to provide for the proper proportions of air and fuel which make up the combustible charge. Even within the explosive limits of the fuel the power developed will vary considerably in accordance with the proportions selected, and the quantity of combustibles present in the gases resulting from explosion will also be determined by this factor. The following table shows the results of analysis of the exhaust gas from an ordinary automobile internal combustion engine utilizing various ratios of air and fuel in the fuel charge, together with figures on the completeness of combustion:

| Percent by volume of fuel in air fuel mixture | Percent by weight of fuel in air fuel mixture | Air-fuel ratio, pounds or air per pounds of fuel | Completeness of combustion | Composition of exhaust gas, percent by volume | | | | | | Total percent of CO, CH$_4$, and H$_2$ in exhaust gas |
|---|---|---|---|---|---|---|---|---|---|---|
| | | | | N$_2$ | CO$_2$ | O$_2$ | CO | CH$_4$ | H$_2$ | |
| 4.27 | 10.0 | 9. | 50 | 71.5 | 5.7 | 1.1 | 13.0 | 1.7 | 7.0 | 21.7 |
| 4.00 | 9.4 | 9.6 | 53 | 72.4 | 5.9 | 1.0 | 12.8 | 1.4 | 6.5 | 20.7 |
| 3.82 | 9.0 | 10.1 | 55 | 73.9 | 6.7 | 1.0 | 11.2 | 1.4 | 5.8 | 18.4 |
| 3.72 | 8.6 | 10.6 | 57 | 75.3 | 7.5 | 1.2 | 9.8 | 1.4 | 4.8 | 16. |
| 3.51 | 8.3 | 11.0 | 62 | 76.6 | 8.2 | .8 | 8.9 | 1.1 | 4.4 | 14.4 |
| 2.72 | 6.5 | 14.5 | 95 | 84.0 | 13.4 | 1.1 | 1.2 | .1 | .2 | 1.5 |

With a fuel-air ratio of 1 pound of fuel per 9 pounds of air 50% complete combustion is obtained. Such a rich mixture would be only partly consumed in the engine as indicated by the fact that the gases resulting from explosion contain 21.7% combustibles. Where the quantity of air in the fuel charge is increased to 11 pounds more complete combustion occurs and the percentage of combustibles in the exhaust is 14.4%. Where a very lean mixture is used with the fuel-air ratio at 1:14½ fairly complete combustion is obtained with smaller amounts of combustibles in the exhaust. The disadvantage, however, of using an extremely lean mixture is that the power developed decreases substantially the more air that is utilized, indicating that the intensity of explosion in the engine becomes less when, in attempting to obtain greater efficiency, the mixture is made too lean. On the other hand, it should be observed that the power developed by an internal combustion engine within the ordinary limits of the air-fuel ratio does not vary directly in accordance with the increase and decrease in the proportions of the air and fuel, and the ratio may be varied within certain limits without substantially affecting the power developed. So far as I can ascertain, however, it is not possible to utilize the fuel in internal combustion engines in the manner now practiced to obtain greatest engine power except under conditions wherein the completeness of combustion of the fuel is relatively low.

In the average internal combustion engine, such as employed in automobiles, greatest power development is obtained when the fuel-air ratio is about 1:12 or 1:13, but there is no apparent loss of power when the mixture is enriched down to a ratio of 1:11 or even 1:9. Under any of these ratios relatively incomplete combustion is obtained, and as indicated by the table substantial quantities of carbon monoxide, hydrogen and methane are present in the exhaust.

The constituents just referred to which, together with nitrogen, carbon dioxide and water vapor make up the gases resulting from explosion in an engine cylinder, are themselves highly combustible and explosive under proper conditions. According to my method, the products of combustion of an engine cylinder are treated to provide the conditions necessary for explosion of the combustible constituents by simple expedients which readily lend themselves to adaptation to various types of engines.

The primary condition necessary to obtain a further explosion from a fuel charge after the same has been subjected to an initial explosion is that a proper quantity of air be added. As in the case of the original fuel charge, the quantity of air must be definitely proportioned. Since the combustibles present in the residual gases will in quantity depend upon the air-fuel ratio of the original fuel charge, it will be evident that the quantity of air which must be admixed with the gases resulting from explosion will be dependent upon and directly related to the original air-fuel ratio. Where a rich mixture is used for the fuel charge, say with a fuel air ratio of 1:9, there will be more combustibles present in the products of combustion and a greater proportion of air must be added than where a leaner mixture, such as 1:12, is used.

Where the original fuel charge comprises a relatively rich mixture, I find no difficulty in producing from the products of combustion a new explosive mixture which is to be used in an engine for the production of additional power. Where, however, leaner mixtures are used for the fuel charge, say from 1:12½ and upward, I find it desirable in order to promote explosion of the combustible constituents, to provide a kindler, in addition to adding air, which may constitute raw fuel or, preferably, vaporized fuel from the charge forming device which prepares the original fuel charge.

The exact amounts of air required and the necessity or lack of necessity of a kindler will vary, as indicated, in accordance with the original proportions of air and fuel in the charge producing the residual gases, and also in part perhaps upon the compression developed and other conditions peculiar to the engine to which the invention is to be applied, so as to be determinable primarily by experimentation. By way of example, however, I may state that for a fuel-air ratio of 1:11, which produced residual gases containing 14.4% of combustibles, air in quantity roughly between 30% and 50% by volume should be added to provide the necessary condition under which the combustible constituents of the products of combustion of the first explosion can be ignited to provide a second explosive power impulse. I do not find it necessary to remove the nitrogen and carbon dioxide from the residual gases before making the new explosive mixture since their presence in the quantities indicated in the table is not such as to interfere with the inflammability of the volatile matter.

The time for the explosive power impulse in the cylinders of internal combustion engines is so short that at completion the residual gases may still be in a more or less flaming state. If additional air were supplied under such conditions the burning might be stimulated. This would be undesirable since at the end of the explosion strokes the pistons in the engine cylinders are at an operating stage where useful power could not be developed. Therefore, the air must be supplied when the products of combustion are no longer flaming, thus enabling a new independent mixture to be produced subject to control which may be reignited and exploded in the engine cylinders under proper operating conditions. I have not found that it is necessary in all cases to take positive measures to extinguish flame in the residual gases produced by the original explosion of fuel charges, such condition varying in different engines and depending in part upon the richness or leanness of the initial fuel charge. I deem it desirable, however, to provide means which will insure extinguishment of any flame present and reduce the temperature of the gases below the point where they are liable to spontaneous combustion merely upon the introduction of the air. As above pointed out, it is contemplated that the conditions under which the new mixture is rendered explosive be produced in the cylinders of the engine in the course of operation. Various expedients to insure flame extinguishment may be employed, some of which are illustrated and later discussed.

In the practical application of my method a conventional engine may be utilized wherein the various engine parts including the cylinders perform in the usual manner, the only essential structural difference residing in the fuel supply lines to and the exhaust lines from the various engine cylinders. Thus, referring to Figures 1 and 2, a line type engine 20 may be used, the same having any desired number of cylinders, eight in number being disclosed. While all of the cylinders and the valve mechanism therefor operate conventionally and in accordance with any desired firing order, only a part of the cylinders 21a, 22a, 23a and 24a will utilize fresh fuel. The remaining cylinders 25b, 26b, 27b and 28b will utilize as their explosive charge the residual gases from the first group of cylinders admixed with air. To this end the fuel supply intake line 29 from the carburetor, or other charge forming device, 30 connects only with the first group of cylinders 21a—24a, the supply of fuel to the cylinders being regulated by conventional intake valves such as 31a. An exhaust manifold 32 for the primary cylinders is provided, the discharge of gases after explosion in the cylinders being regulated as conventionally by exhaust valves such as 33a.

Figures 1, 2, 3:
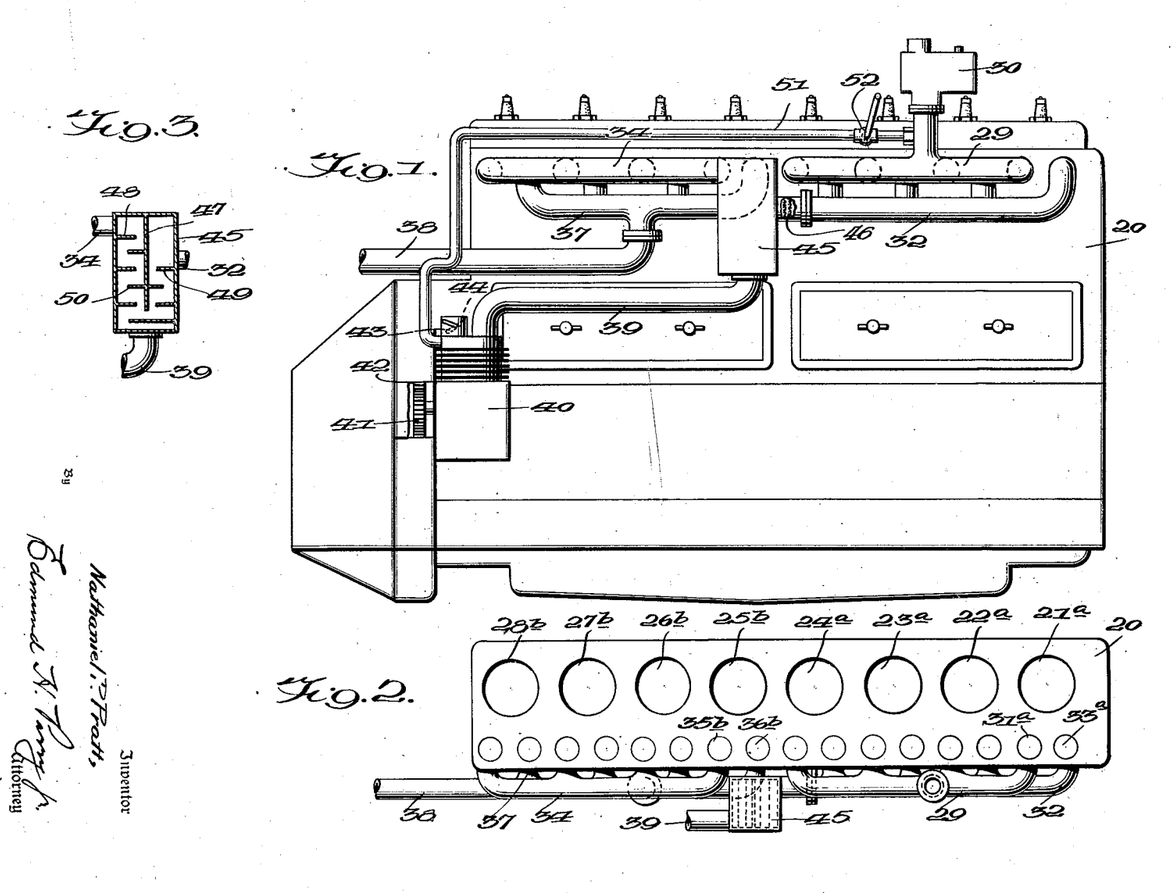
Fig. 1 is a view in side elevation of a conventional cylinder-in-line type of engine having eight explosion cylinders employing an arrangement of parts effecting operation according to the present method.
Fig. 2 is a top plan view of the engine of Fig. 1 with the engine head removed.
Fig. 3 is a sectional elevation of a detail of construction shown in Figs. 1 and 2.

A separate intake manifold 34 is provided for the group of secondary explosive cylinders 25b—28b, the supply of explosive material to the cylinders therefrom being controlled by intake valves such as 35b. The discharge of exhaust gases from the secondary cylinders is controlled by exhaust valves such as 36b and is carried away by an exhaust manifold 37 and the exhaust line 38.

To supply the secondary cylinders with a combustible charge the products of explosion from the primary cylinders must be admixed with air in proportions such as are suitable to support explosion of the combustible constituents in the gases. As pointed out, the quantity of air necessary will be determined by the air-fuel ratio of the fuel charge to the primary cylinders as regulated in the charge forming device 30. To this end an air supply line 39 is provided through which air is supplied to be admixed with the products of combustion of the primary cylinders coming through the primary exhaust manifold 32. The resulting mixture is then conducted through the secondary intake manifold 34 and supplied to the secondary cylinders 25b—28b as required.

In order to insure thorough integration of the residual gases with air, it may be desirable to provide a mixing chamber 45—the function of which is generally analogous to the carburetor 30 of the primary cylinders. The gases are carried from the exhaust manifold 32 into this chamber with which the air line 39 also connects, and after integration the new explosive mixture passes from the chamber into the secondary intake manifold 34. I have illustrated a pump 40 as the source of air supply, the same being mounted at any desired point in the engine and driven from the engine as by gear 41 meshing with teeth 42 on the fly-wheel. Whether the air must be supplied under pressure by means of such a pump will be determined in a large measure by the particular engine involved, it being pointed out in this connection that the pressure in the exhaust manifold 32 of the primary cylinders and the connecting intake manifold 34 of the secondary cylinders is small by reason of the fact that the intake of gases to the secondary cylinders takes place at the same rate as the discharge of residual gases from the primary cylinders. Where an air pump is used, its capacity, and its speed relative to the engine as determined by the size of the gear 41, should be such as to supply air in proper quantity necessary to support explosion of the combustible constituents of the residual gases. By driving the air pump from the engine, the rate of air supply will vary in direct proportion to the discharge from the primary cylinders and the intake to the secondary cylinders under different engine speeds. In order to provide for a variation in quantity of air for different air-fuel ratios of the primary fuel charge at the carburetor 30, the intake 43 of the air pump may be provided with an adjustable valve 44, or some other suitable control mechanism.

The conditions in the primary engine cylinders 21a—24a and the proportions of the exhaust manifold 32 therefrom may be such that by the time the residual gases discharged from the primary cylinders are ready for admixture with air from the air line 39 they will be in non-flaming condition. However, to positively insure such state and prevent flaming and spontaneous combustion of the combustible constituents of the gases when brought into the presence of the additional air, it is deemed desirable to interpose between the primary exhaust manifold 32 and the air supply suitable flame extinguishing mechanism. Thus, a flame trap or screen 46 may be interposed in the path of the residual gases from the primary cylinders as in the primary exhaust manifold 32 at the intake end of the mixing chamber 45. Further, to reduce the gases below kindling temperature and insure a thorough integration of the gases and the air, the mixing chamber, as shown in Figure 3, may be provided with a series of baffles 47, 48, 49 and 50 around which the gases both before and after admixture with air pass before admission to the intake manifold 34 of the secondary cylinders.

In order to promote an explosion of the new mixture in the secondary cylinders when the engine is first started and again where the fuel mixture supplied to the primary cylinders is relatively lean and such as to provide small quantities of combustibles in the gases resultant from explosion, a pipe line 51 controlled by a valve 52 adapted to supply a kindler to the mixture, as by connection with the intake 43 of the air pump, may be provided. Such auxiliary supply line may connect with any suitable source of fresh fuel, as for example with the carburetor 30 of the primary cylinders.

It will be understood that all of the cylinders in the engine operate as conventionally on the 4-cycle principle, both the primary and secondary cylinders drawing in their respective charges, compressing, exploding, and finally discharging the same. By the arrangement of parts shown the fuel charge from the carburetor 30 will be supplied as required through the intake manifold 29 to the primary cylinders 21a—24a under control of intake valves, and after explosion in the individual cylinders the products of combustion will pass out through primary exhaust manifold 32 in a continuous stream, be admixed with proper quantities of air in the mixing chamber 45, and then supplied to the individual secondary cylinders 25b—28b under control of intake valves, and after explosion in the latter the residual gases are finally conducted away from the engine through the secondary exhaust manifold 37 and the exhaust pipe 38. It will be understood, of course, that the grouping of primary cylinders and secondary cylinders is subject to any desired variation, and in the illustrative engine the use of the first four cylinders as the primary cylinders and the second group of four successive cylinders as the secondary cylinders is merely to enable a simple arrangement of the various intake and exhaust manifolds for the two groups.

Figure 4:
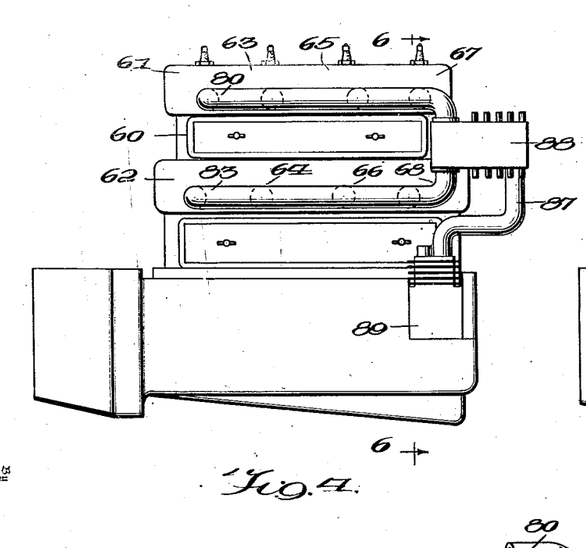
Fig. 4 is a side elevation of a further engine, radically different in cylinder arrangement from the engine of Fig. 1 and itself novel in design, showing another structural embodiment of my inventive method.
Figure 5:
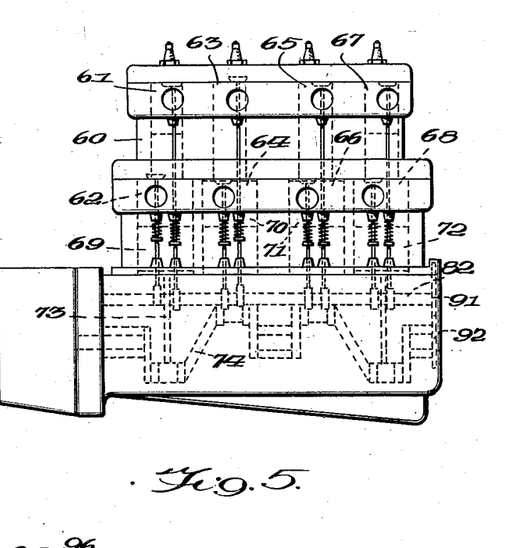
Fig. 5 is a view similar to Fig. 4, but with certain parts removed and indicating the inner parts of the engine.
Figure 6:
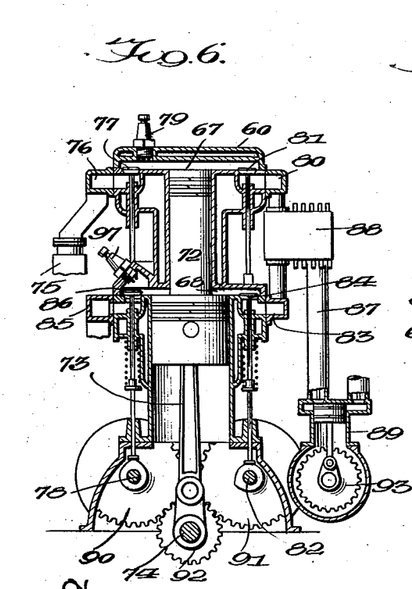
Fig. 6 is a view in transverse section taken on the line 6—6 of Fig. 4.

To further illustrate the application of my method I have in Figures 4, 5 and 6 illustrated a further engine 60 of somewhat different type, in which two groups of cylinders are arranged in tandem, one group over the other, and having common pistons and crank-shaft connections. The upper cylinders are designated as 61, 63, 65 and 67 and the lower group as 62, 64, 66 and 68. Differential pistons 69, 70, 71 and 72 work in these cylinders and are connected by suitable connecting rods 73 to a crank-shaft 74.

In operating according to my method, the upper and lower groups of cylinders will operate, one group on fresh fuel charges supplied from a suitable charge forming device, and the other group will operate by explosion upon a mixture of air and the residual gases from the first group. In the engine shown the upper cylinders have been selected as the primary cylinders, these being supplied with a fresh fuel mixture from a charge forming device 75 through an intake manifold 76, admission of the charge into the cylinders 61, 63, 65 and 67 being controlled by suitable intake valves 77 operated, in the conventional manner, from a cam shaft 78. The charge after compression in the upper cylinders is ignited by means of suitable spark plugs 79. After explosion in the upper cylinders, the resultant gaseous products of combustion pass out into the exhaust manifold 80, the outward passage of the gases from the cylinders being controlled by suitable exhaust valves 81, operated from a cam shaft 82.

The lower group of cylinders 62, 64, 66 and 68 operate in the same manner as the upper cylinders just described, the same being provided with an intake manifold 83 controlled by intake valves 84, which are operated from the cam shaft 82. The exhaust manifold for the lower secondary cylinders is indicated at 85, the discharge from the cylinders being controlled by exhaust valves 86 operated from the cam shaft 78.

As best shown in Figure 4, the products of combustion from the upper primary cylinders are supplied through the exhaust manifold 80 to the lower secondary cylinders through the intake manifold 83. To supply the requisite quantity of air an air supply conduit 87 is provided through which air is introduced into a mixing chamber 88 with which the primary exhaust manifold 80 and the secondary intake manifold 83 connect.

If desired an air pump 89 may be utilized as the source of air supply. As shown in Figure 6, the cam shafts 78 and 82 for the intake and exhaust valves of the upper and lower cylinders are provided with gears 90 and 91 driven through a gear 92 on the crank-shaft 74. The air pump may, if desired, be driven by a gear 93 meshing with the cam gear 91.

Figure 11:
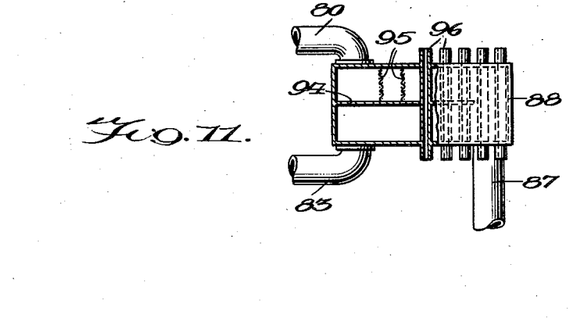

To insure a proper admixture of the air and residual gases from the primary cylinders, the mixing chamber 88 may be constructed as shown in Figure 3 or, alternately, as illustrated in detail in Figure 11. The residual gases produced by explosion in the various primary cylinders are conducted through the manifold 80 to this chamber which is provided with a dividing partition 94 extending for the main part of the length of the chamber. A flame screen in the form of wire gauze 95 may be provided in the upper portion of the chamber. Before admixing the gases with air supplied through pipe 87 it may be desirable to further cool the gases to prevent spontaneous combustion, and to this end the mixing chamber may be cooled by a series of hollow tubes 96 extending completely through the chamber, as shown, through which air may pass. The gases will come in contact with these tubes and be cooled to some degree. After admixture with the air the gases are conducted through the lower portion of the chamber 88 out through the secondary intake manifold 83 and thence to the secondary combustion cylinders.

It is to be understood that the secondary cylinders operate in the same manner as the primary cylinders, igniting means such as spark plugs 97 being provided to fire the explosive mixture comprising the residual gases from the primary cylinders and air.

Both the upper and lower cylinders will operate according to the 4-cycle principle, serving to draw in a charge, compress, and then fire the same, and finally discharge the products of explosion. There will be a constant flow of fresh fuel charges from the charge forming device to the upper cylinders through the primary intake manifold 76 and a discharge after explosion through the primary exhaust manifold 80. The lower secondary explosion cylinders will constantly receive an explosive mixture through the flow of exhaust gases from the primary cylinders into the chamber 88 wherein air is added, by means of the secondary intake manifold 83. The new explosive mixture is drawn into the secondary cylinders as required, compressed, exploded, and finally discharged through the exhaust manifold 85.

The upper and lower cylinders, such as 67 and 68 illustrated in Figure 6, of each tandem group, are arranged to operate so that while an explosion occurs in one cylinder the other cylinder will intake a new charge. The various tandem groups may operate according to any desired firing order by proper arrangement of the crankshaft 74 and timing of the valves by the cams on the cam shafts 78 and 82. By reason of the fact that the intake valves 77 of the upper cylinders and the exhaust valves 86 of the lower cylinders operate from the common cam shaft 78 through separate cams as indicated in Figure 5, and the primary exhaust valves 81 and the secondary intake valves 84 operating from the common cam shaft 82, it is necessary that the gears 91 and 92 be in such ratio to the driving gear 93 as to operate only at half the speed that they would have in a conventional line engine.

Figures 7, 8, 9, 10:
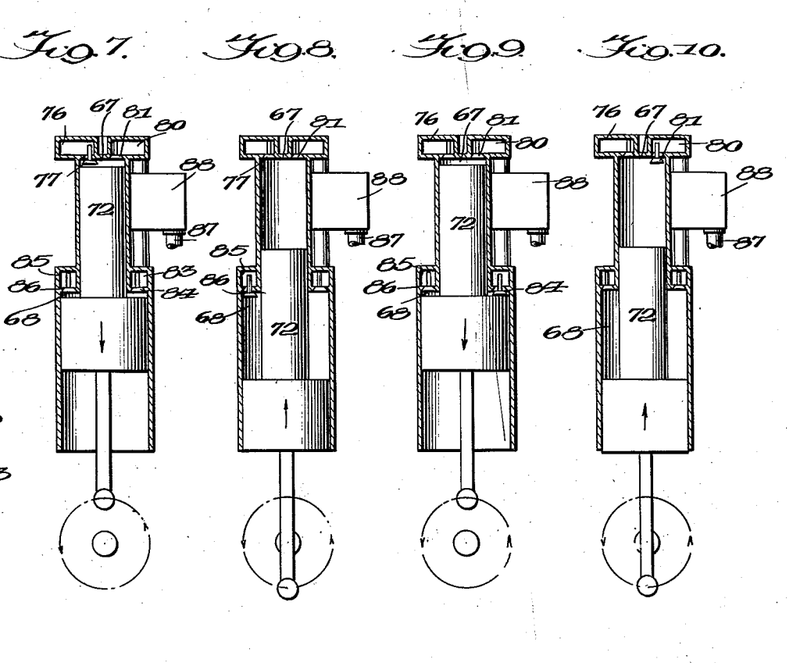
Figs. 7 to 10, inclusive, are diagrammatic views corresponding to Fig. 6 and indicating the various stages of operation of the cylinders; and, Fig. 11 is a sectional elevation in detail of a part shown in Figs. 4 and 6, the same being a modification of the construction illustrated in Fig. 3.

To make clear the cycle in the respective cylinders of each tandem pair reference may be had to the diagrammatic views, Figures 7, 8, 9 and 10, wherein the pistons and valves are shown at various operating stages. A complete cycle will occur every two revolutions of the crank shaft. At the stage shown in Figure 7 the piston 72 is about to move downward. The fuel intake valve has opened to allow a fuel charge to be admitted from the primary intake 76 into the primary upper cylinder 67. The exhaust valve 81 is, of course, closed. At this stage an explosive mixture supplied from the mixing chamber 88 has been compressed in the lower secondary cylinder 68. Both the secondary intake valve 84 and exhaust valve 86 are closed and the charge is exploded to force the differential piston 72 downwardly. The power impulse transmitted to the piston by explosion in the secondary cylinders facilitates the intake of a fresh fuel charge into the primary cylinder. In the next stage, as shown in Figure 8, the piston has reached the lower end of its stroke and is about to move upwardly. Both the intake and exhaust valves in the upper primary cylinder 67 are closed for the compression of the fuel charge which has just been drawn in. The secondary cylinder having fired, the exhaust valve 86 opens to allow the discharge of the residual gases into the exhaust manifold 85. At the next stage, as shown in Figure 9, the piston has reached the upper end of its stroke to fully compress the charge in the upper cylinder 67 and scavenge the gases from the secondary cylinders 68. The ignition and explosion occurs in the upper cylinder to drive the piston downwardly for a power stroke, and at the same time the intake valve 84 of the secondary cylinder opens to allow a new secondary charge to be drawn in from the mixing chamber 88. At the end of the downward movement of the piston the same starts to move up as shown in Figure 10. The discharge valve 81 of the primary cylinder opens to allow the cylinder to be scavenged and supply residual gases for the secondary cylinders to pass into the chamber 88 for admixture with air. The secondary cylinder having drawn in a new secondary charge on the previous downward stroke of the piston, the intake and exhaust valves are now both closed to provide for compression of the secondary charge. The next stage will be as shown in Figure 7, the cycle described being continuously repeated in each pair of tandem cylinders.

With the several types of engines and the structural arrangements thereof to carry out my method just described, it is believed that anyone skilled in the art will readily see how my invention may be applied to the operation of other types of engines. Regardless of cylinder disposition and the firing order in various cylinders, it will now be appreciated that by relatively simple expedients I am able to reduce the consumption of fuel in internal combustion engines in half and yet obtain full explosive power impulses in each cylinder. As will now be evident, the practical application of my method is simplicity itself, involving the proper arrangement of the intake and exhaust manifolds of several groups of cylinders so that one group will operate on fresh fuel charges and the other group on an explosive mixture formed from the residual products of combustion from the first cylinders.

Where in the specification and the accompanying claims I use terms such as "fuel charge" and "explosive mixture", or equivalent expressions, with reference to the original and secondary combustible charges utilized in the various cylinders according to my method, I mean a highly inflammable fluid mixture of combustible carbonaceous materials and air, in which the constituents are definitely proportioned so that the quantity of air will support and promote violent explosion and intense burning of the volatile matter. It should be observed, however, that as heretofore explained the explosive charge utilized in the second group of cylinders and derived from the exhaust gases is of entirely different chemical composition than the original charge used in the first stage of the process. The original fuel is variously referred to as "fresh fuel", "unburned fuel", and "motor fuel", and these terms are used in the claims to mean conventional fuels, such as gasoline.

The present application is a continuation in part of my prior application Serial No. 402,500, filed October 25, 1929. Such parts of the present disclosure as are new in the present application are merely in the nature of improvements or refinements upon the basic method and principle of engine operation disclosed in the prior case.

I claim:

1. The method of utilizing the energy of the exhaust gases resulting from the explosion of a fuel charge in an internal combustion engine which includes producing a new charge by mixing the exhaust gases with air in a proportion definitely related to the air-fuel ratio of the original charge, conducting the resultant mixture into another cylinder on the suction stroke, compressing the mixture in the last-mentioned cylinder, and then exploding it therein in the presence of air.

2. The method of utilizing the energy of fuel charges in internal combustion engines which comprises obtaining two explosive power impulses from each charge thereof and which includes regulating the air-fuel ratio of a fresh unburned fuel charge to produce substantial quantities of combustible constituents in the exhaust when the charge is exploded, forming a new charge for the engine by mixing the resultant exhaust gases with air in a proportion definitely related to the air-fuel ratio of the original charge, conducting the mixture thus produced into another cylinder on the suction stroke, compressing the mixture in said cylinder, and exploding it therein.

3. The method of continuously utilizing the energy of fuel in internal combustion engines which comprises obtaining two explosive power impulses from each charge of the fuel, and which includes vaporizing liquid hydrocarbon fuel with air to form a fuel charge sufficiently rich to provide substantial quantities of combustible constituents in the gases resultant from the explosion, introducing and exploding the charge in an engine cylinder, removing the resulting gases from the cylinder and forming a new explosive charge by mixing said gases with air in quantity such as to support explosion of the combustible constituents of the gases, and compressing and exploding the new charge in another engine cylinder.

4. The method of utilizing fuel in internal combustion engines which comprises producing a plurality of explosive power impulses from each quantity of fuel, and which includes introducing, compressing and exploding in an engine cylinder fuel in the form of an explosive charge of vaporized hydrocarbon fuel and air in quantity such as to provide substantial portions of combustibles in the gases resulting from the explosion, withdrawing the gases from the cylinder and adding thereto air in quantity such as to support explosion of the combustibles thereby to provide a new explosive charge, and thereafter introducing, compressing and exploding the new charge in another engine cylinder.

5. The method of utilizing fuel in a multi-cylinder internal combustion engine which comprises obtaining two explosive power impulses from each quantity of fuel, and which includes supplying fresh fuel to a portion only of the cylinders of an engine and exploding it therein in the presence of air proportioned to provide substantial quantities of combustible constituents in the gases resultant from explosion, withdrawing the gases from the cylinders following explosion and supplying them to other cylinders of the engine, admixing air with the gases in quantity such as to support explosion of the combustible constituents of the gases before introduction into said other cylinders to provide a new explosive mixture, the new mixture being compressed and exploded in the last-mentioned cylinders.

6. The method of utilizing fuel in a multi-cylinder internal combustion engine which comprises producing a plurality of power impulses from the fuel and which consists in passing the fuel successively through a plurality of cylinders, the fresh fuel being compressed and exploded in the first cylinder in the presence of air in quantity such as to leave substantial quantities of combustibles after explosion, the resultant being thereafter discharged from the cylinder and then being formed into a new charge by admixture with air proportioned to support explosion of the combustibles in the resultant, and the new charge then being supplied to another cylinder and compressed and exploded therein.

7. The method of utilizing motor fuel in internal combustion engines which consists in passing the fuel from one engine cylinder to another, the fuel being exploded in the first cylinder in a charge including air proportioned to leave substantial quantities of combustibles after explosion, withdrawing the resultant from the cylinder and passing it to another cylinder, adding air to the resultant during passage between cylinders in quantity such as to support explosion of the combustibles to provide a new charge, and compressing and exploding the resulting new charge in the second cylinder.

8. The method of utilizing motor fuel in a multi-cylinder internal combustion engine which comprises obtaining explosive power impulses in a plurality of cylinders from each fuel charge supplied, and which includes regulating the air-fuel ratio of a charge to produce substantial quantities of combustible constituents in the exhaust when the charge is exploded, exploding the charge in one engine cylinder, withdrawing the resultant exhaust from said cylinder and forming a new charge for the engine by mixing the resultant exhaust from the cylinder with air in a proportion dependent upon the air-fuel ratio of the original charge which determines the quantity of combustibles present in the exhaust, conducting the new charge into another cylinder on the intake stroke, compressing the charge in said cylinder, and exploding it therein.

9. The method of utilizing motor fuel in internal combustion engines which includes introducing and exploding the fuel in a charge in an engine to produce a first power impulse, thereafter withdrawing the residual gases from said explosion from said engine, adding air to the residual gases and forming a new combustible mixture in non-flaming condition, and compressing and exploding said mixture in an engine to produce a second power impulse.

10. The method of utilizing fuel in internal combustion engines which includes forming an explosive charge of hydrocarbon fuel and air and introducing and exploding the charge in an engine unit to produce a first power impulse, thereafter, while the residual gases from said explosion are in non-burning condition, forming a new explosive charge by mixing air with the gases to support combustion of the combustible constituents thereof and adding a minor quantity of fresh fuel to promote explosion, and compressing and exploding the resulting mixture in another engine unit to produce a second power impulse.

11. The method of utilizing motor fuel in internal combustion engines which includes introducing and exploding the fuel in a charge in an engine unit to produce a first power impulse, thereafter extinguishing any flame present in the residual gases from said explosion and forming from said gases a new explosive mixture by the addition of air in quantity such as to support explosion of the combustibles present in said gases, and compressing and exploding said mixture in another engine unit to produce a second power impulse.

12. The method of utilizing the exhaust gases resulting from the explosion of fresh fuel charges in internal combustion engines which includes withdrawing the gases from an engine unit as produced by the explosion of a fuel charge, passing the gases through flame extinguishing means, adding air to form therewith a new explosive mixture, the quantity of air being definitely related to the quantity of combustible constituents in the gases in the same manner as the proportions of air and fuel in the fuel charges which produce the exhaust gases, and then introducing on the intake stroke and thereafter compressing and exploding the new mixture in another engine unit to produce a power impulse.

13. The method of utilizing motor fuel in internal combustion engines which comprises producing successive explosive power impulses, and which includes forming the fuel into rich explosive fuel charges to produce substantial quantities of combustibles following explosion, exploding the fuel charges in an engine to produce primary power impulses, thereafter withdrawing from the engine the residual gases as produced, passing the same through a flame extinguisher and admixing air therewith in such proportions as to render the combustibles in the gases explosive, and compressing and exploding the resulting mixture in an engine to produce secondary power impulses.

14. The method of utilizing motor fuel in internal combustion engines which comprises producing successive explosive power impulses, and which includes introducing fuel charges into one or more primary cylinders and compressing and exploding the same therein to produce power impulses, introducing and exploding in other secondary cylinders to produce secondary power impulses the residual gases from the explosions in the first-mentioned cylinders, the residual gases being withdrawn from the primary cylinders as produced and before introduction into the secondary cylinders being put in non-flaming condition and admixed with air in quantities sufficient to support explosion of the combustible constituents thereof.

15. The method of operating internal combustion engines which comprises obtaining two distinct explosive power impulses from portions of the fuel and which includes compressing and exploding fresh fuel charges in some engine cylinders to produce power impulses therein, and compressing and exploding in other cylinders to produce power impulses therein charges formed from the exhaust gases from the first-mentioned cylinders, the exhaust gases being withdrawn from the first cylinders as produced, put in non-burning condition and admixed with air in quantity sufficient to support explosion of the combustible constituents thereof, and the resulting mixture being thereafter supplied as required to the second-mentioned cylinders.

16. The method of utilizing motor fuel in internal combustion engines which comprises obtaining successive explosive power impulses, and which includes introducing and exploding in one or more engine cylinders fuel charges in which the air and fuel are proportioned to produce substantial quantities of combustibles in the gases resultant from explosion, withdrawing the resultant gases, cooling the gases and forming a new explosive charge by admixing the resultant gases with air in such proportions as to support explosion of the combustibles, conducting the new charge into one or more other engine cylinders and compressing and exploding the same therein.

17. The method of utilizing motor fuel in a multi-cylinder internal combustion engine which comprises producing successive explosive power impulses, and which includes forming the fuel into rich explosive charges which upon explosion will leave substantial quantities of combustibles in the gases resultant from explosion, supplying the charges as required to some of the engine cylinders and exploding the same therein, withdrawing the gases resultant from explosion from the cylinders, extinguishing combustion of the resultant gases and forming a new explosive mixture by admixing the gases with air in such proportions as to support explosion of the combustibles in the gases, and thereafter supplying the new mixture as required to other engine cylinders and exploding the same therein.

18. The method of utilizing the energy of motor fuel in an internal combustion engine which comprises obtaining two explosive power impulses from each charge of fuel, and which includes vaporizing hydrocarbon fuel with air to provide an explosive charge, conducting said hydrocarbon charge without the addition of products of combustion to one or more of the engine cylinders and compressing and firing the charge therein for a primary development of power, then discharging the gases resulting from said firing from said primary power cylinders, forming a new charge by admixing air with the discharged gases in quantity proportioned to support explosion of the combustibles present in the gases, conducting the new charge to additional cylinders of the engine other than the primary power cylinders, introducing into the additional cylinders said new charge as the main charge and a supplementary amount of fuel to insure explosion of said charge, and compressing and firing the charge in said cylinders for a secondary development of power.

19. The method of utilizing the energy of motor fuel in an internal combustion engine which comprises obtaining two explosive power impulses from each charge of fuel, and which includes vaporizing hydrocarbon fuel with air to provide an explosive charge, conducting said hydrocarbon charge without the addition of products of combustion to one or more of the engine cylinders and compressing and firing the charge therein for a primary development of power, then discharging the gases resulting from said firing from said primary power cylinders, cooling the gases and forming a new charge by admixing air with the discharged gases in quantity proportioned to support explosion of the combustibles present in the gases, conducting the new charge to additional cylinders of the engine other than the primary power cylinders, introducing into the additional cylinders said new charge, and compressing and firing the charge in said cylinders for a secondary development of power.

20. The method of utilizing the energy of motor fuel in an internal combustion engine which comprises obtaining two explosive power impulses from each charge of fuel, and which includes vaporizing hydrocarbon fuel with air to provide an explosive charge, conducting said hydrocarbon charge without the addition of products of combustion to one or more of the engine cylinders and compressing and firing the charge therein for a primary development of power, then discharging the gases resulting from said firing from said primary power cylinders, cooling the gases and forming a new charge by admixing air with the discharged gases in quantity proportioned to support explosion of the combustibles present in the gases, conducting the new charge to additional cylinders of the engine other than the primary power cylinders, introducing into the additional cylinders said new charge as the main charge and a supplementary amount of fuel to insure explosion of said charge, and compressing and firing the charge in said cylinders for a secondary development of power.

21. The method of developing power from hydrocarbon fuel which includes confining a mixture of fuel and air in proportions constituting an explosive charge, compressing the mixture, then firing the same to produce an explosion, developing through the force of the explosion wave a power impulse, withdrawing the residual gases resulting from the explosion, forming a new explosive charge by admixing air with said residual gases in proportions to support explosion of the combustibles constituting a part of said residual gases and under conditions such that combustion does not exist therein and said charge is rendered available as a new explosive fuel supply, confining and compressing the new charge, then firing the same to produce an explosion, and developing through the force of the explosion wave a further power impulse.

22. The method of utilizing the energy of fuel to produce power which includes forming fresh fuel into an explosive charge with air, confining and compressing said charge, firing the same and transmitting the resulting explosive power impulse to a power shaft, and continuing by withdrawing and collecting as formed the residual gases resulting from said combustion and forthwith admixing the same with air in an amount proportioned with respect to the combustibles present in said residual gases to form from said gases a new explosive mixture, utilizing said new mixture by confining and compressing the same, then firing it and transmitting the resulting explosive power impulse to a power shaft, and continuously repeating the several steps, whereby from the fresh fuel supplied in each original charge a plurality of explosive power impulses are developed and utilized.

23. The method of operating a multicylinder internal combustion engine which comprises preparing an explosive mixture of air and fresh fuel, delivering the mixture into one or more of the engine cylinders as the operating charge therefor on the intake stroke, then compressing it, then firing it to produce an explosive power impulse, withdrawing the exhaust gases resulting from combustion from said cylinder and admixing the same as withdrawn with air in an amount proportioned with respect to the combustibles present in said exhaust gases to form from said gases a new explosive mixture, delivering the new mixture as the operating charge into one or more other engine cylinders, then compressing it, then firing it to produce an explosive power impulse, and continuously repeating the forming and firing of the respective explosive mixtures in the respective cylinders.

24. The method of operating a multiplicity of internal combustion engine cylinders which comprises continuously preparing an explosive mixture of air and fresh fuel, distributing the mixture as formed to some of the combustion cylinders constituting only a part of the complete group of cylinders as the operating charge therefor, introducing the mixture into each cylinder of the partial group on each intake stroke therein, then compressing it, then firing it to produce explosive power impulses, withdrawing the resulting exhaust gases from each of said cylinders following combustion, continuously collecting the exhaust gases from the several cylinders as withdrawn and admixing the collected gases with air supplied in amounts proportioned with respect to the combustibles present in said exhaust gases to form from said gases a new explosive gaseous mixture, continuously distributing said new mixture to other combustion cylinders of the group as the operating charge therefor, introducing the new mixture into each of said other cylinders on each intake stroke therein, then compressing it, then firing it to produce explosive power impulses, and continuing the several operations, whereby the fresh fuel initially introduced into and supplying the demands of only a part of the group of engine cylinders provides the operating charge for and produces explosive power impulses in all of the cylinders of the engine.

25. The method of developing dual power from motor fuel such as gasoline in internal combustion engines which includes, carbureting unburned motor fuel with air to provide a vaporized explosive power-producing engine charge but having an air-fuel ratio such that combustible reaction gases, developed during explosion of the charge, remain unconsumed and are present in the exhaust gases in such quantity as to render said exhaust suitable for a subsequent explosion, compressing and exploding the vaporized motor fuel charge in internal combustion engine cylinders to develop engine power, thereafter withdrawing the resulting exhaust gases and in succession forming a gaseous new explosive power-producing engine charge by admixing said exhaust gases with a proportion of air to sustain explosion of the unconsumed combustible gases of the exhaust, controlling the supply of air mixed with the exhaust gases in accordance with the air-fuel ratio of the original charge which determines the proportion of combustibles in the exhaust, and utilizing the gaseous new explosive charge as a new engine operating charge by compression, explosion and power development in different engine cylinders than the cylinders operating on the original motor fuel charge.

26. A method of utilizing fuel in internal combustion engines which comprises admixing the same with air in such quantity as to produce a relatively rich explosive mixture adapted to leave a substantial quantity of unburned constituents in the resultant gases capable of being exploded upon the addition of an appropriate amount of air, confining, compressing and exploding successive portions of said mixture to produce power impulses, withdrawing the resultant gases, adding air thereto while in a non-burning state in such proportion as to provide a separate new explosive mixture, and confining, compressing and exploding successive portions of said new explosive mixture to produce further power impulses.

27. A method of utilizing fuel in internal combustion engines which comprises admixing the same with air in such quantity as to produce a relatively rich explosive mixture, confining, compressing and exploding successive portions of said mixture to produce power impulses, withdrawing the resultant gases, adding air and a small amount of fresh fuel thereto while in a non-burning state, said resultant gases, fresh fuel and air being mixed in such proportions as to provide a separate new explosive mixture, and confining, compressing and exploding successive portions of said new explosive mixture to produce further power impulses.

NATHANIEL P. PRATT.